Figure 1:
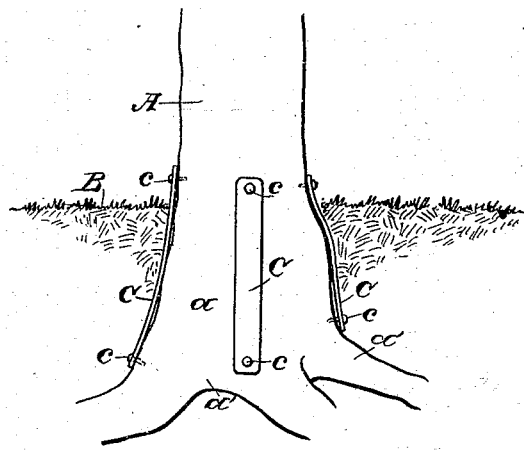

(No Model.)

E. H. BLACK.
TREE PROTECTOR.

No. 503,759. Patented Aug. 22, 1893.

Witnesses,

Inventor,
Edwin H. Black
By Dewey & Co.
Attys

UNITED STATES PATENT OFFICE.

EDWIN H. BLACK, OF CAMPBELL, CALIFORNIA.

TREE-PROTECTOR.

SPECIFICATION forming part of Letters Patent No. 503,759, dated August 22, 1893.

Application filed February 20, 1893. Serial No. 463,097. (No model.)

*To all whom it may concern:*

Be it known that I, EDWIN H. BLACK, a citizen of the United States, residing at Campbell, Santa Clara county, State of California, have invented an Improvement in Tree-Protectors; and I hereby declare the following to be a full, clear, and exact description of the same.

My invention relates to that class of tree protectors in which a shield, more or less complete, is applied to the tree, to prevent animals and vermin from eating the bark.

In California there is a small burrowing rodent, commonly called a "gopher." It lives underground and makes tunnels in every direction, seeking for the roots of plants, shrubs and trees. It is very destructive, and by reason of the concealment of its journeys, its approach to, or its presence in the vicinity of a tree or shrub is not suspected until the damage is done. This renders it of more importance to protect the tree than to attempt the capture or destruction of the gopher. While the animal will eat off many roots of the tree, this damage is but partial and temporary. The principal injury it occasions is the "girdling" of the base of the trunk, at a point above where the main roots branch, and below the surface of the ground. Whenever by accident or design the gopher reaches this point, it will invariably eat the bark off completely around, and the tree dies. Attempts have been made to prevent animals both above and below ground from reaching the tree, by surrounding it at a little distance with a cylindrical shield, sometimes above ground and sometimes driven into the ground. These shields may consist of cylindrical sheets of tin or rings of wire netting or gauze, and as a make-shift shingles have been driven in the ground to present barriers to the approach of the animal. But in all instances these devices have been separated from the tree by a distance which would permit a gopher to work in under and behind them, and they are more of the nature of guards, to deflect the animal from his course, than of direct protecting sheaths. They have not been placed in contact with the tree to form an immediate sheathing therefor, because in the form generally used they would prevent the growth of the trunk. I am aware of the wrapping of the trunk above ground with various materials, such as reeds, rushes, cloth, fabrics and tarred paper, to prevent sunburn and the ravages of insects, but these would not, even if located below ground, prevent the gopher from accomplishing its purpose.

My invention which is readily distinguishable from these devices, consists of a series of metallic strips, vertically disposed directly against the base of the tree, and separated from each other, said strip or strips extending from the surface of the ground down to the point where the main roots diverge.

Figure 2:
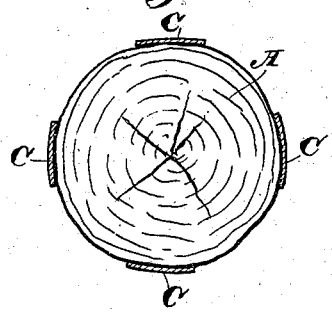

Referring to the accompanying drawings for a more complete explanation of my invention,—Figure 1 is a view showing the application of my protector to the base of a tree. Fig. 2 is a horizontal section through the base, showing the location of the protecting strips.

A is a tree trunk, of which *a* is the base below the surface B of the ground and extending down to where the roots branch at *a'*.

C are metallic strips. There may be two or more of these. I have here shown four. They are placed vertically directly against the base of the tree and they extend from the roots upwardly to the surface of the ground and, in practice, a little above, in order that they may be seen to be in place. They are separated from each other, as shown, so that they do not completely encircle the trunk, and thus cannot interfere with its growth. They are preferably held in place by a small tack *c* at each end, driven into the trunk. Now, although portions of the trunk base are left bare, and, in fact, a great portion, and, though, the gopher may eat out these exposed portions, he cannot girdle the trunk by eating completely around it, and he cannot, therefore, kill the tree. In fact he will injure it but slightly for it is not likely that he will eat out each bare portion successively. It is probable he will desist after finding that he cannot pass the strips, and experience has proven this to be the case. The strips being directly against the tree, give no opportunity to get behind them, and they thus furnish complete protection, being at the same time, cheap and easily applied.

Having thus described my invention, what I claim as new, and desire to secure by Letters Patent, is—

A tree protector, consisting of a series or number of metallic strips placed and held vertically directly against the base of the tree trunk, said strips being separated from each other and extending from the surface of the ground downwardly to the roots, substantially as herein described.

In witness whereof I have hereunto set my hand.

EDWIN H. BLACK.

Witnesses:
 WM. THACKERAY,
 JAMES MASON.